United States Patent [19]
Overbury

[11] 3,836,978
[45] Sept. 17, 1974

[54] COMMUTATED ANTENNA ARRAY WITH GRATING LOBE REDUCTION MEANS IN A DOPPLER RADIO NAVIGATION BEACON SYSTEM

[75] Inventor: Francis Giles Overbury, Cuffley, England

[73] Assignee: International Standard Electric Corporation, New York, N.Y.

[22] Filed: Oct. 23, 1973

[21] Appl. No.: 408,460

[30] Foreign Application Priority Data
Oct. 31, 1972  Great Britain.................... 50050/72

[52] U.S. Cl......... 343/854, 343/106 D, 343/108 M, 343/876
[51] Int. Cl........................... H01q 3/24, G01s 1/44
[58] Field of Search.... 343/854, 777, 106 D, 106 R, 343/108 M, 108 R, 876

[56] References Cited
UNITED STATES PATENTS
3,754,261  8/1973  Earp ................ 343/106 D

*Primary Examiner*—James W. Lawrence
*Assistant Examiner*—Marvin Nussbaum
*Attorney, Agent, or Firm*—William T. O'Neil

[57] ABSTRACT

A commutated antenna array for a Doppler type radio navigation beacon system in which there are reference and main arrays. A limited number of additional elements are added to the main array on a semi-random basis and an adjustment in the commutated reference cycle is made in accordance with main array element spacing. Multi-path problems resulting from use of wide antenna spacing in the main array of a commutated reference Doppler Beacon are reduced.

6 Claims, 2 Drawing Figures

PATENTED SEP 17 1974  3,836,978

3,836,978

COMMUTATED ANTENNA ARRAY WITH GRATING LOBE REDUCTION MEANS IN A DOPPLER RADIO NAVIGATION BEACON SYSTEM

CROSS-REFERENCE TO RELATED APPLICATIONS

This application is filed under the provisions of 35 U.S.C. 119, with claim for the benefit of the filing of an application covering the same invention, filed in Great Britain Oct. 31, 1972; Ser. No. 50050/72.

BACKGROUND OF THE INVENTION

1. Field of the Invention

The invention relates generally to electronic air navigation aids, and particularly to radio navigation ground becaons of the simulated Doppler type, in which an antenna array is commutated and angular position data is air-derived therefrom; for example as recognized in U.S. patent class 343/108.

2. Description of the Prior Art

In the prior art, the type of Doppler navigation beacon to which the present invention applies, is well know. For example, such systems are shown in the patent literature in U.S. Pat. Nos. 3,626,419 and 3,670,337. In addition, various modifications of the commutated arrays used in those systems have been devised. The present application discloses an improvement in systems of the type disclosed in U.S. Pat. No. 3,728,729 issued Apr. 17, 1973. The disclosure of that U.S. Pat. No. (3,728,729) is hereby incorporated herein by reference.

In U.S. Pat. No. 3,728,729 a system is described which includes a main linear array of equally spaced radiators, means for commutating energy at a first radio frequency to each of said radiators in turn, a reference linear array also of equally spaced radiators in substantial "end-fire" alignment with said main array. The length of the entire reference array is equal to the apacing between adjacent radiating elements of the main array, and means are provided for commutating energy at a second radio frequency different from said first radio frequency to each of the reference radiators in succession. The commutation cycle of said reference array is completed during energization of each of the main array radiators by the first radio frequency. Moreover, commutation (scan) of the two arrays is in opposite directions.

The operation of the system of U.S. Pat. No. 3,728,729 while advantageous over the older prior art, gave rise to a "grating lobe" problem. Specifically, in the utilization of that prior art system, air derived-angular data to an accuracy of 0.01 degrees can require a main array length as much as 120 wavelengths, with radiators spaced four wavelengths. The spacing of reference array elements would then typically be one third wavelength (there being 12 radiating elements in the reference array). The use of this wide radiation spacing (in excess of one wavelength) in the main array inevitably involves the generation of grating lobes which fall in the service sector (angular sector of navigational interest).

The aforementioned grating lobes manifest themselves as a vulnerability to multipath interference comparable to the multi-path effects otherwise known as occurring close to the normal line of sight bearing. The multipath effect herein of concern is that centered around the angles of grating lobes as these might correspond with one of the usefule direct bearing angles in an air approach situation.

The described condition cannot be improved through tracking filter or processor methods to any greater extent than such processors can improve operation on multipath energy close to the "normal" bearing. This is because a coherent phase modulation of the array identical with that produced by distrubances close to the desired bearing is involved.

The manner in which the present invention deals with the prior art problem described will be understood as this description proceeds.

SUMMARY OF THE INVENTION

In accordance with the aforementioned prior art disadvantages, it may be said to have been the general object of the present invention to provide a commutated antenna sub-system for a Doppler navigation beacon with reduced grating lobe effects and therefore with a capability for providing air-derived angle information with increased accuracy.

To accomplish the improved performance desired, there is provided a radio navigation beacon including a first linear array of m radiating elements equally spaced on a modulus of $p$, a second linear array in substantial alighnment therewith (i.e., in the same line as said first linear array). Said second array has n radiators of adjacent element spacing $xp$, where $x$ is any integer from 1 to $m$, and means are also included for commutating energy at a second radio frequency offset from said first radio frequency, during energization of each of the n radiators by said first radio frequency, in succession to as many of said m radiators as corresponds to the spacing between the second array radiator being energized and the next second array radiator to be energized.

The invention will be better understood from the following further description taken in conjunction with the accompanying drawing.

DESCRIPTION OF THE PREFERRED EMBODIMENTS

Figure 1:
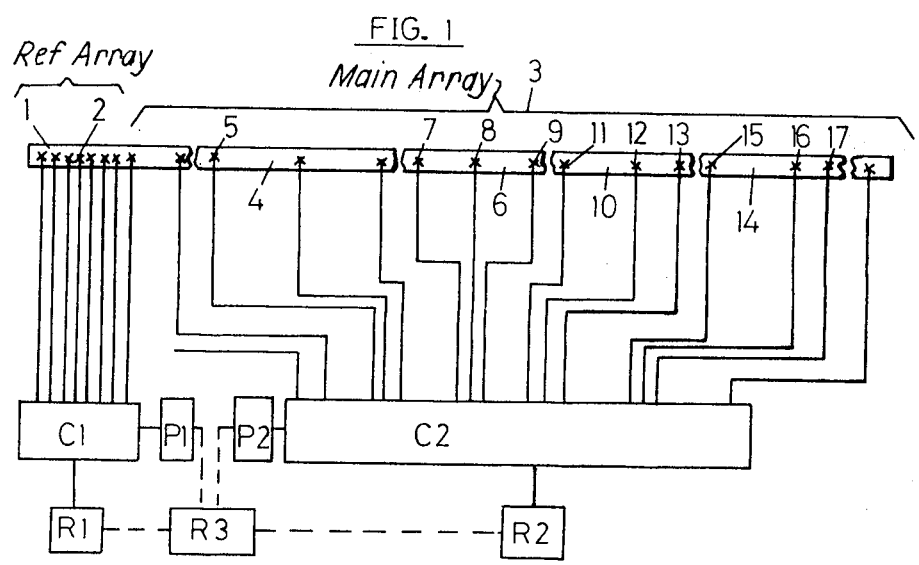
FIGS. 1 and 2 respectively show alternative arrangements of a radio navigation beacon embodying the invention in schematic form.

Referring to FIG. 1 a first (reference) array 1 comprises eight radiating elements (radiators), typically 2, spaced a quarter of a wavelength apart. Aligned therewith is a second (main) array 3 some sections of which, such as 4, comprise radiators such as 5, spaced two wavelengths apart. Another section (or sections) of array 3, such as 6, comprises radiators 7, 8 and 9 spaced one wavelength apart. A further section or sections of this array, such as 10, comprises radiators 11, 12, and 13, 12 being spaced one and a quarter wavelengths from 11 and three quarters of a wavelength from 13. Yet another section or sections, such as 14, comprises radiators 15, 16 and 17, 16 being spaced one and a half wavelengths from 15 and one half wavelength from 17.

In operation, a first radio frequency is commutated in turn to each of the aerials of the main array. Whilst each aerial of the main array is radiating at this frequency, a second, slightly offset radio frequency is commutated to the aerials of the reference array, in the opposite direction of scan to that of the main array. The structure of the controlling and commutating circuitry required is shown in the (incorporated by reference) specification of U.S. Pat. No. 3,728,729.

Where the main array commutation is in a section such as 4, all the reference radiators are commutated in turn. Where the main array commutation is in any one of the sections such as 6, 10 or 14, instead of scanning the whole reference sequence of eight radiators, the reference array scanning pattern stops at the fourth, fifth or sixth reference radiator; i.e., corresponding proportionally to the main aerial spacing. In this way a varied array spacing in units of quarter wavelengths is accommodated. Stated otherwise, the reverse scanning reference array linear program includes only as many of its eight radiating elements in its scan during each main array radiator excitation as there are quarter wavelengths between the main array element then excited and the next suceeding main array radiating element to be energized in the main array scan program.

The beacon described above may be considered as a modification of the main array of U.S. Pat. No. 3,728,729, with its equally spaced radiators, of number $n_1$ in that a (limited) number of radiating elements are added to this array to make the total number $n$, where $1.5 > n/n_1 > 1$ (approximately). This addition is done on a "semi-random" basis to avoid the generation of similar grating lobes a few degrees further out.

It is not necessary to start with the main array described in U.S. Pat. No. 3,728,729, with its equally spaced elements, it being possible to alter the original spacing law as long as a limit is imposed on the maximum spacing of the aerials.

Thus, the main array may be comprised of a total number of n radiating elements, with the spacing between any adjacent pair not exceeding the original spacing.

Figure 2:
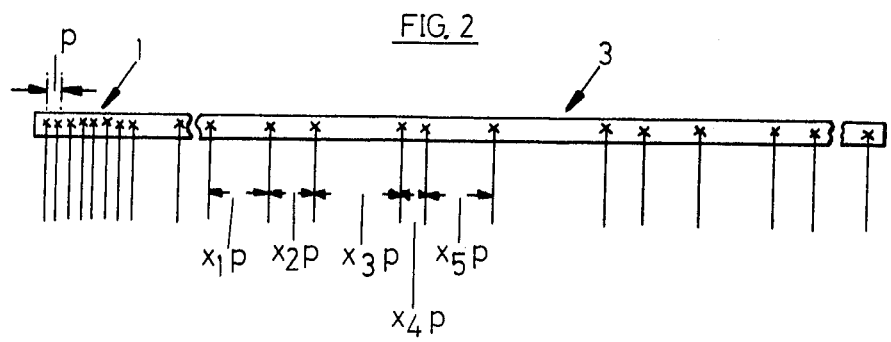

As shown in FIG. 2, the elements may be spaced from one another by any integral multiple, $x_1$, $x_2$, $x_3$, $x_4$, $x_5$, of the space $p$. The said $p$ is of course, the spacing between adjacent radiators of the reference array. The values of $x_1$, $x_2$, $x_3$, etc., need not bear any particular relationship to each other, but none of them exceeds the number of elements in the reference array.

Although the reference and main array excitation frequencies are offset for system reasons relating to the air-derivation of angle data (as is well known in this art), they are not so different as to make a significant difference in radiation spacing of a specified fraction or number of wavelengths of either array.

Modifications and variations within the concept of the invention will suggest themselves to those skilled in this art, and accordingly it is not intended that the scope of the invention be limited by the drawing or this description, these being illustrative only.

What is claimed is:

1. A commutated antenna array arrangement for a Doppler radio navigation beacon system comprising:
   a reference linear array of m radiating elements uniformly spaced by an amount p;
   a main linear array of n radiating elements along an extension of the line of said reference array, said main array n elements being spaced by an amount $xp$, where $x$ is an integer varying along the length of said main array;
   first means for commutating said main array thereby to energize said main array radiating elements successively in a first direction along the line of said arrays;
   and second means for successively energizing a portion of the m elements of said reference array, said portion commutated being equal to the multiple of intervals p of spacing between said main array element being energized and the next element of said main array to be energized, each of the reference array commutation cycles being completed within the time of energization of the corresponding main array element.

2. Apparatus according to claim 1 in which the radiators m of said reference array are eight in number and are spaced one quarter wavelength and the n radiators of said main array are spaced by an amount not exceeding two wavelengths.

3. Apparatus according to claim 2 in which said main element array radiators are spaced according to a random program throughout the length of said main array.

4. Apparatus according to claim 1 in which said commutation of said portion of the elements of said reference array progresses in a direction opposite to said first direction.

5. Apparatus according to claim 2 further defined in that said main array comprises a first set of radiators uniformly spaced by two wavelengths and a second set of radiators, each radiator of which is placed between a pair of adjacent radiators of said first set.

6. Apparatus according to claim 5 in which said radiators of said second set are approximately half in number of the radiators of said first set.

* * * * *